United States Patent
Okada et al.

(10) Patent No.: US 10,824,425 B2
(45) Date of Patent: Nov. 3, 2020

(54) SELECTING DESTINATION FOR PROCESSING MANAGEMENT INSTRUCTIONS BASED ON THE PROCESSOR BUFFER SIZE AND UNCOMPLETED MANAGEMENT INSTRUCTIONS

(71) Applicant: Hitachi, Ltd., Tokyo (JP)

(72) Inventors: Wataru Okada, Tokyo (JP); Keisuke Okamura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 367 days.

(21) Appl. No.: 15/900,825

(22) Filed: Feb. 21, 2018

(65) Prior Publication Data

US 2019/0087181 A1 Mar. 21, 2019

(30) Foreign Application Priority Data

Sep. 15, 2017 (JP) .................................. 2017-177957

(51) Int. Cl.
  *G06F 9/30* (2018.01)
  *G06F 3/06* (2006.01)
  (Continued)

(52) U.S. Cl.
  CPC ............ *G06F 9/3004* (2013.01); *G06F 3/067* (2013.01); *G06F 3/0611* (2013.01);
  (Continued)

(58) Field of Classification Search
  None
  See application file for complete search history.

(56) References Cited

U.S. PATENT DOCUMENTS 7,734,894 B1 * 6/2010 Wentzlaff ................ G06F 15/16
                                                                   712/10
8,495,294 B2 * 7/2013 Murayama ............ G06F 3/0605
                                                                   710/2

(Continued)

FOREIGN PATENT DOCUMENTS

JP        2005-148911 A     6/2005
WO     2007/043142 A1    4/2007
  (Continued)

OTHER PUBLICATIONS

Japanese Office Action received in corresponding Japanese Application No. 2017-177957 dated Nov. 27, 2018.

*Primary Examiner* — Abu Zar Ghaffari
(74) *Attorney, Agent, or Firm* — Mattingly & Malur, PC

(57) ABSTRACT

A storage system includes a management processor and main processors. Each of the main processors is configured to alternately switch between a period in which main function processing, including I/O processing in response to an I/O request from a host, is executed and a period in which a management instruction is executed. The management processor is configured to: manage information associating each of uncompleted management instructions, which are already transmitted to the main processors, with a transmission destination main processor to which the each of the uncompleted management instructions is transmitted; select, based on the uncompleted management instructions of the main processors, a transmission destination main processor to which a next management instruction is to be transmitted, from among the main processors; and transmit the next management instruction to the selected transmission destination main processor.

8 Claims, 17 Drawing Sheets

(51) Int. Cl.
*G06F 15/82* (2006.01)
*G06F 9/48* (2006.01)

(52) U.S. Cl.
CPC .......... *G06F 3/0656* (2013.01); *G06F 3/0659* (2013.01); *G06F 9/4881* (2013.01); *G06F 15/82* (2013.01)

(56) References Cited

U.S. PATENT DOCUMENTS

| | | | |
|---|---|---|---|
| 10,579,528 B2* | 3/2020 | Hwang | G06F 1/3275 |
| 10,609,129 B2* | 3/2020 | Lam | G06F 9/505 |
| 10,642,505 B1* | 5/2020 | Kuzmin | G06F 3/0647 |
| 2007/0008884 A1* | 1/2007 | Tang | H04L 47/283 370/230 |
| 2008/0209423 A1* | 8/2008 | Hirai | G06F 11/1482 718/102 |
| 2015/0026336 A1* | 1/2015 | Suchter | H04L 43/0876 709/224 |
| 2015/0067014 A1 | 3/2015 | Akagawa et al. | |
| 2015/0269239 A1* | 9/2015 | Swift | G06F 16/27 707/610 |
| 2017/0109204 A1* | 4/2017 | Feng | G06F 9/5083 |

FOREIGN PATENT DOCUMENTS

| | | |
|---|---|---|
| WO | 2015/033412 A | 3/2015 |
| WO | 2016/166844 A1 | 10/2016 |

\* cited by examiner

MANAGEMENT INSTRUCTION BUFFER 323

| PROCESSOR ID 331 | MANAGEMENT INSTRUCTION 332 |
|---|---|
| 1 | REFER TO VOL |
| 1 | REFER TO VOL |
| 2 | CREATE VOL |
| 2 | SET HOST INFORMATION |

FIG.2

MANAGEMENT INSTRUCTION TYPE TABLE 367

| MANAGEMENT INSTRUCTION TYPE 671 | PROCESSING NODE 672 | PROCESSING TIME (MASTER NODE) 673 | PROCESSING TIME (SLAVE NODE) 674 |
|---|---|---|---|
| VOL REFERENCE | MASTER/SLAVE | 5msec | 5msec |
| VOL CREATION | MASTER/SLAVE | 15msec | 15msec |
| HOST INFORMATION SETTING | MASTER | 300msec | - |

FIG.3

PROCESSOR TABLE 366

| STORAGE NODE ID 661 | PROCESSOR ID 662 | MANAGEMENT INSTRUCTION BUFFER SIZE 663 | MASTER/SLAVE 664 |
|---|---|---|---|
| 1 | 1 | 4 | MASTER |
| 1 | 2 | 4 | MASTER |
| ... | | | |

FIG.4

| REQUEST MANAGEMENT API ID | TRANSMITTED MANAGEMENT INSTRUCTION ID | STORAGE NODE ID | PROCESSOR ID | MANAGEMENT INSTRUCTION TYPE | PROCESSING TIME | TRANSMISSION TIME | MANAGEMENT INSTRUCTION COMPLETION STATUS |
|---|---|---|---|---|---|---|---|
| 1 | 1 | 100 | 1 | VOL REFERENCE | 5msec | 15:10:02.58 | COMPLETED |
| 1 | 2 | 100 | 1 | VOL CREATION | 15msec | 15:10:02.60 | NOT COMPLETED |
| | | ... | | | | | |

MANAGEMENT INSTRUCTION HISTORY TABLE

*FIG.5*

| MANAGEMENT MODULE ID (701) | MASTER/SLAVE (702) | IP ADDRESS (703) |
|---|---|---|
| 1 | MASTER | 192.168.xx.xx |
| 2 | SLAVE | 192.168.xx.yy |
|  |  |  |
|  |  |  |

MANAGEMENT MODULE TABLE

*FIG.14*

| REQUEST MANAGEMENT API ID 681 | TRANSMITTED MANAGEMENT INSTRUCTION ID 682 | STORAGE NODE ID 683 | PROCESSOR ID 684 | MANAGEMENT INSTRUCTION TYPE 685 | PROCESSING TIME 686 | TRANSMISSION TIME 687 | MANAGEMENT INSTRUCTION COMPLETION STATUS 688 | INSTRUCTION SOURCE MANAGEMENT MODULE ID 689 |
|---|---|---|---|---|---|---|---|---|
| 1 | 1 | 100 | 1 | VOL REFERENCE | 5msec | 15:10:02.58 | COMPLETED | 2 |
| 1 | 2 | 100 | 1 | VOL CREATION | 15msec | 15:10:02.60 | NOT COMPLETED | 2 |
| | ... | | | | | | | |

MANAGEMENT INSTRUCTION HISTORY TABLE

*FIG. 15*

SELECTING DESTINATION FOR PROCESSING MANAGEMENT INSTRUCTIONS BASED ON THE PROCESSOR BUFFER SIZE AND UNCOMPLETED MANAGEMENT INSTRUCTIONS

CLAIM OF PRIORITY

The present application claims priority from Japanese patent application JP2017-177957 filed on Sep. 15, 2017, the content of which is hereby incorporated by reference into this application.

BACKGROUND

This invention relates to a storage system. The background art of this disclosure includes, for example, WO 2015/033412 A1. In WO 2015/033412 A1, the following configuration is disclosed (see Abstract, for example):

A computer system includes a plurality of processing computers capable of switching between a period in which main function processing is executed and a period in which management function processing is executed for every given length of time, and a management computer holding a schedule table to schedule the execution of the management function processing for each processing computer and instructing each processing computer to execute management function processing. Before starting management function processing, the processing computer notifies the start time and end time of this management function processing to the management computer. When notified of the start time and the end time, the management computer updates the schedule table. To instruct one of the processing computers to execute management function processing, the management computer refers to the schedule table and determines which processing computer is available for the execution of the management function processing.

SUMMARY

The computer alternately executing management processing and main function processing, which is processing other than the management processing, receives an instruction for management processing (a management instruction) at regular intervals and executes the instructed processing sequentially. This means that processing time increases significantly when processing for one management instruction and processing for the subsequent management instruction are not completed in one management processing period, and that management processing next to time-consuming management processing is significantly delayed.

An aspect of this disclosure is a storage system including a management processor, and a plurality of main processors. Each of the plurality of main processors is configured to alternately switch between a period in which main function processing, including I/O processing in response to an I/O request from a host, is executed and a period in which a management instruction is executed. The management processor is configured to: manage information associating each of uncompleted management instructions, which are already transmitted to the plurality of main processors, with a transmission destination main processor to which the each of the uncompleted management instructions is transmitted; select, based on the uncompleted management instructions of the plurality of main processors, a transmission destination main processor to which a next management instruction is to be transmitted, from among the plurality of main processors; and transmit the next management instruction to the selected transmission destination main processor.

According to the one embodiment of this disclosure, management processing can be executed efficiently while diminishing the influence of management processing on main function processing.

BRIEF DESCRIPTION OF THE DRAWINGS

FIG. 2 is a diagram for illustrating a configuration example of a management instruction buffer.

FIG. 3 is a diagram for illustrating a configuration example of a management instruction type table.

FIG. 4 is a diagram for illustrating a configuration example of a processor table.

FIG. 5 is a diagram for illustrating a configuration example of a management instruction history table.

FIG. 14 is a diagram for illustrating a configuration example of a management module table.

FIG. 15 is a diagram for illustrating another configuration example of the management instruction history table.

DETAILED DESCRIPTION OF THE EMBODIMENTS

Computer systems according to embodiments of this disclosure are described below with reference to the drawings. This disclosure is not limited to the embodiments described below.

In a storage system according to an example of this disclosure, each of a plurality of processors switches between a period in which main function processing, including I/O processing in response to an I/O request from a host, is executed, and a period in which a management instruction is executed. The storage system selects, based on uncompleted management instructions of a plurality of processors, a transmission destination processor to which the next management instruction is to be transmitted. Efficient execution of management instructions by a plurality of processors is accomplished in this manner.

First Embodiment

Figure 1:
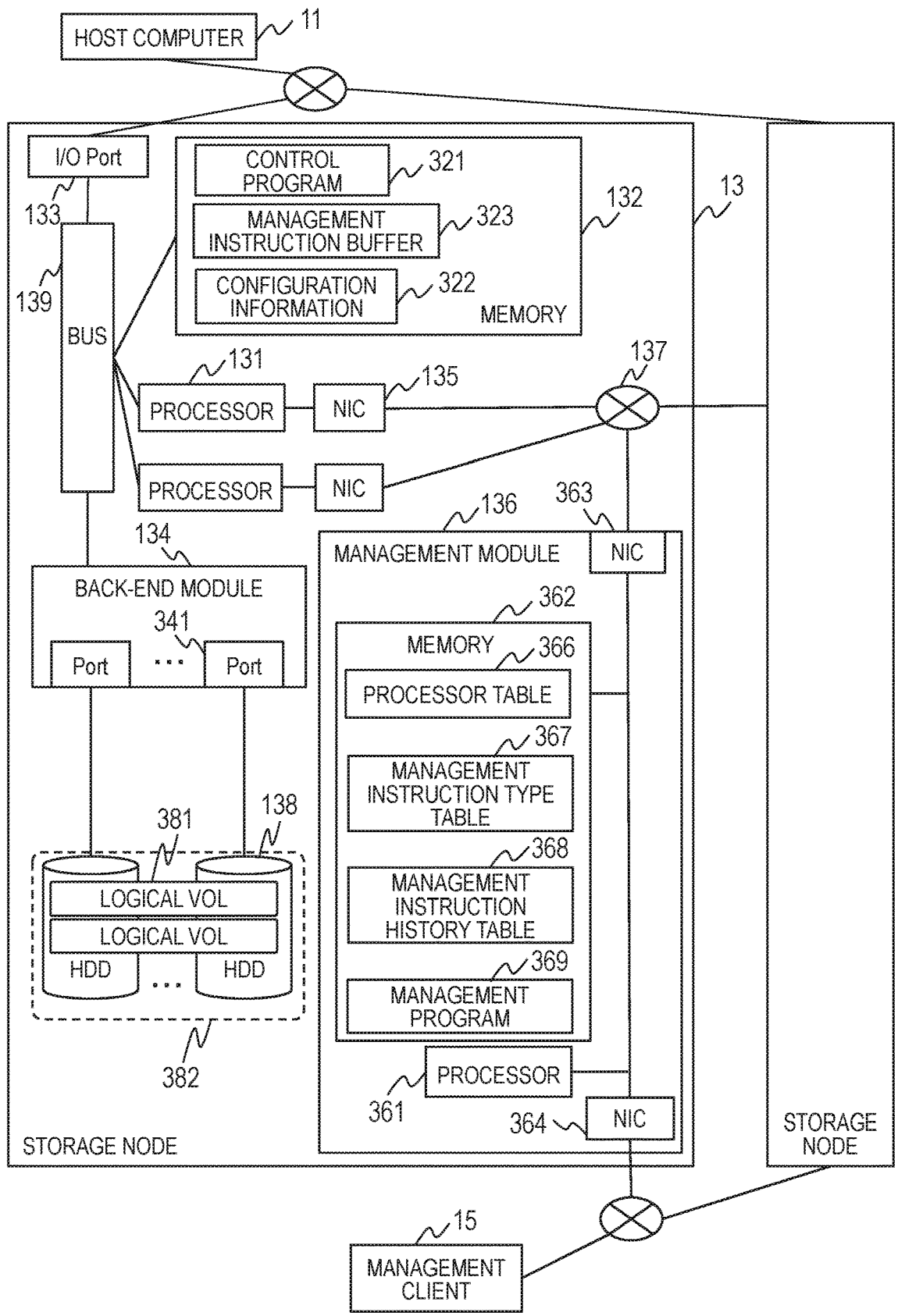
FIG. 1 is a diagram for illustrating a configuration example of a computer system according to a first embodiment of this disclosure.

FIG. 1 is a diagram for illustrating a configuration example of a computer system. The computer system includes a host computer 11, a storage system, which includes a plurality of storage nodes 13, and a management client 15. The computer system can include any number of host computers 11, any number of storage nodes 13, and any number of management clients 15. In the following description, each of the plurality of storage nodes 13 has the same configuration.

The host computer 11 can hold communication to and from the plurality of storage nodes 13 over a data network. The management client 15 can hold communication to and from the plurality of storage nodes 13 over a management network. The host computer 11 and the management client 15 can have a typical computer configuration. For example, the host computer 11 and the management client 15 each include a processor, a main memory in which a program executed by the processor and data used by the program are stored, auxiliary storage, an input/output interface, and an input/output device. The input/output interface includes a network interface and an interface of an input/output device.

Each storage node 13 includes a plurality of processors (main processors) 131, a memory 132, an I/O port 133, and a back-end module 134, which are coupled so as to be capable of holding communication to and from one another via a bus 139. The storage node 13 further includes a plurality of network interface controllers (NICs) 135, a plurality of storage drives 138, and a management module 136.

The storage drives 138 include media in which write data from the host computer 11 is ultimately stored. Hard disk drives (HDDs) are used as final data storage apparatus in the example of FIG. 1. The storage drives 138 can be other types of storage drives, for example, solid state drives (SDDs), which use flash memories.

The plurality of storage drives 138 in the example of FIG. 1 form a RAID group 382. Each logical volume 381 is configured from a part of storage areas of the storage drives 138 forming the RAID group 382. Host data from the host computer 11 is stored in each logical volume 381.

The back-end module 134 is an interface for communication of the storage drives 138 to and from the processors 131 and the memory 132. The back-end module 134 includes ports 341 each of which is coupled to one of the storage drives 138. The back-end module 134 executes conversion between a protocol used for communication via the bus 139, for example, PCI-Express, and a protocol used for communication to and from the storage drives 138, for example, Serial Attached SCSI.

Each storage drive 138 in one storage node 13 may or may not be accessible from (shared by) the storage node 13 that does not include this storage drive. The plurality of storage drives 138 may be placed outside a storage node and coupled to the plurality of storage nodes 13 so that the storage drives 138 can be accessed from the plurality of storage nodes 13 via a back-end switch.

Each storage node 13 holds communication to and from the host computer 11 via the I/O port 133. The I/O port 133 receives a read/write (I/O processing) request and write data from the host computer 11, transmits a response containing read data to the host computer 11 in response to a read request, and transmits a response to a write request to the host computer 11.

The I/O port 133 executes conversion between a protocol used for communication of the storage node 13 to and from the host computer 11 and a protocol used within the storage node 13.

The I/O port 133 and the host computer 11 are coupled to each other by a storage area network (SAN), which is formed with the use of Fibre Channel, for example. The processors 131 operate as given function modules as programmed by a program stored in the memory 132 and, in this example, execute I/O processing under control of a control program 321.

The memory 132 includes a cache memory area, a shared memory area, and a local memory area. The cache memory area temporarily stores host data to be written to the storage drives 138 and host data read out of the storage drives 138. The shared memory area stores information shared among the storage nodes 13, and stores, in this example, configuration information 322.

Information about the configuration of the computer system is stored as the configuration information 322. The configuration information 322 holds information about, for example, the host computer, the storage nodes, volumes including virtual volumes and logical volumes, a storage pool, and the RAID group.

Information stored in the shared memory area is synchronized among the storage nodes 13. The storage node 13 that holds the latest information is the master node, and the other storage nodes 13 are slave nodes. The processors 131 of the master node update the held configuration information first. After the update of the configuration information 322 in the master node, the processors 131 of each slave node changes the configuration information 322 held in its own node so that the update is reflected on its own configuration information 322. The slave node may update the configuration information 322 as instructed by the master node, or may make an inquiry about an update to the master node.

The local memory area is used and updated by the storage node 13 in which the memory 132 is located, and stores information that is not synchronized with (not shared by) other storage nodes. The local memory area in this example stores the control program 321 and a management instruction buffer 323.

The control program 321 executes management processing and main function processing, which is processing other than the management processing. The main function processing includes I/O processing relevant to requests from the host computer 11. The management processing is processing relevant to management instructions from the management module 136, and includes a reference to and an update of information about a volume, a storage node, or the host computer. The control program 321 receives a management instruction from the management module 136, and refers to or updates the configuration information 322 as instructed.

As described later, each processor 131 receives, at regular intervals, management instructions executable in a particular period, and executes the management instructions sequentially. The management instruction buffer 323 is an area in which management instructions are temporarily stored until the processors 131 receive the management instructions. The management instruction buffer may be located in each NIC 135, which is associated with one of the processors 131.

Each of the plurality of processors 131 is associated with a corresponding NIC 135. Each processor 131 is coupled to a network 137 via its associated NIC 135. The processor 131 holds communication to and from another storage node 13 and the management module 136 over the network 137. The network 137 is, for example, a LAN.

Each NIC 135 can be a physical device or a virtual device. A plurality of processors 131 may share a physical NIC by which virtual NICs 135 each associated with one of the plurality of processors 131 are provided.

The management module 136 is an interface through which a management request from the management client 15 is received. The management module 136 holds communication to and from the processors 131 of the storage node 13 that includes this management module 136 and the processors 131 of other storage nodes 13 over the network 137.

The management module 136 includes a processor (management processor) 361, a memory 362, and NICs 363 and 364, which are capable of communication to and from one another via a bus. The NIC 363 is coupled to the network 137, and the NIC 364 is an interface through which communication to and from the management client 15 is held. The management module 136 may be coupled to the management client 15 and to the network 137 by a single NIC.

The processor 361 operates as given function modules as programmed by a program stored in the memory 362. The memory 362 stores a management program 369. The memory 362 further stores a processor table 366, a management instruction type table 367, and a management instruction history table 368.

The management program 369 provides a management application programming interface (API) to the management client 15. The management program 369 receives a management request to the management API, converts the received request into management instructions directed to at least one processor 131 in its own storage node 13, and transmits each of the management instructions to the relevant processor 131. The management instruction may be issued at any time.

The management instruction is stored in a buffer of the NIC 135 associated with the transmission destination processor 131. The processor 131 obtains the management instruction from the NIC 135 at a particular time, and stores the obtained management instruction in the management instruction buffer 323.

For example, the management program 369 receives from the management client 15 a management request to create a hundred logical volumes. The management program 369 generates from this management request a hundred management instructions each of which instructs to create one of the hundred logical volumes. The management program 369 distributes the hundred management instructions among the plurality of processors 131.

The configuration example of FIG. 1 may be modified so that a single management module outside a storage node transmits management instructions to the plurality of storage nodes 13. For example, the management module is coupled to the plurality of storage nodes 13 via a network and transmits at least one management instruction generated from a management request from the management client 15 to at least one processor 131 of at least one storage node 13.

FIG. 2 is diagram for illustrating a configuration example of the management instruction buffer 323. The management instruction buffer 323 temporarily stores management instructions directed to the processors 131. The management instruction buffer 323 includes a processor ID column 331 and a management instruction column 332. The processor ID column 331 indicates the ID of a processor that is to execute a management instruction. The management instruction column 332 stores the management instruction. In FIG. 2, only the management instruction type is illustrated for each management instruction as an example.

FIG. 3 is a diagram for illustrating a configuration example of the management instruction type table 367. The management instruction type table 367 holds information about each type of management instructions issued to the processors 131 by the management module 136. The management instruction type table 367 includes a management instruction type column 671, a processing node column 672, a processing time (master node) column 673, and a processing time (slave node) column 674.

The management instruction type column 671 indicates the type of a management instruction. The processing node column 672 indicates, for each management instruction type, the attribute (master/slave) of storage nodes that can execute a management instruction of the type. As described above, the master node is a node that holds the latest version of information stored in the shared memory area, which is the latest configuration information 322 in this example, and slave nodes are nodes that are not the master node.

Each type of management instruction can be executed by one or both of the master node and slave nodes. The processing time (master node) column 673 indicates, for each management instruction type, a processing time expected when the master node executes a management instruction of the type. The processing time (slave node) column 674 indicates, for each management instruction type, a processing time expected when a slave node executes a management instruction of the type.

When it is required for a slave node to refer to the latest configuration information 322 in order to execute a management instruction, the slave node checks the configuration information 322 held by the master node. A processing time required for a slave node to process a particular management instruction is therefore longer than a processing time required for the master node to process the management instruction in some cases.

Thus, there are cases in which a processing time required for the master node to process a management instruction and a processing time required for a slave node to process the management instruction differ from each other. More suitable assignment of management instructions to the processors 131 is accomplished by managing the expected processing time of the master node and the expected processing time of a slave node.

FIG. 4 is a diagram for illustrating a configuration example of the processor table 366. The processor table 366 holds information about the processors 131 of the storage node 13. The processor table 366 includes a storage node ID column 661, a processor ID column 662, a management instruction buffer size column 663, and a master/slave column 664.

The storage node ID column 661 indicates, for each processor 131, the ID of the storage node 13 in which the processor 131 is located. The processor ID column 662 indicates, for each processor 131, the ID of the processor 131 that is used in its storage node 13. The management instruction buffer size column 663 indicates, for each processor 131, the size of a management instruction buffer that stores management instructions issued to the processor 131 from the relevant management module 136.

The management instruction buffer 323 in this example stores management instructions issued from a plurality of management modules 136 to one processor 131. The buffer size allocated to a single processor 131 in the management instruction buffer 323 is equal to or more than a value written in the management instruction buffer size column 663. The buffer size is expressed by the number of management instructions in the configuration example of FIG. 4, but may instead be expressed in data size (bytes).

FIG. 5 is a diagram for illustrating a configuration example of the management instruction history table 368. The management instruction history table 368 holds information about management instructions issued by the management module 136. The management instruction history table 368 includes a request management API ID column 681, a transmitted management instruction ID column 682, a storage node ID column 683, a processor ID column 684, a management instruction type column 685, a processing time column 686, a transmission time column 687, and a management instruction completion status column 688.

One entry of the management instruction history table 368 indicates information about one management instruction transmitted to one of the processors 131. The request management API ID column 681 indicates the ID of a management request from the management client 15 from which the management instruction is generated. The transmitted management instruction ID column 682 indicates the ID of the management instruction. The storage node ID column 683 indicates the ID of the transmission destination storage node 13 to which the management instruction is transmitted. The processor ID column 684 indicates the ID (intra-storage node ID) of the transmission destination processor 131 to which the management instruction is transmitted.

The management instruction type column 685 indicates the type of the management instruction. The processing time column 686 indicates the length of time expected for the completion of the processing of the management instruction by the processor 131. The transmission time column 687 indicates a time at which the management instruction is transmitted. The management instruction completion status column 688 indicates whether the transmitted management instruction is completed or uncompleted.

Figure 6:
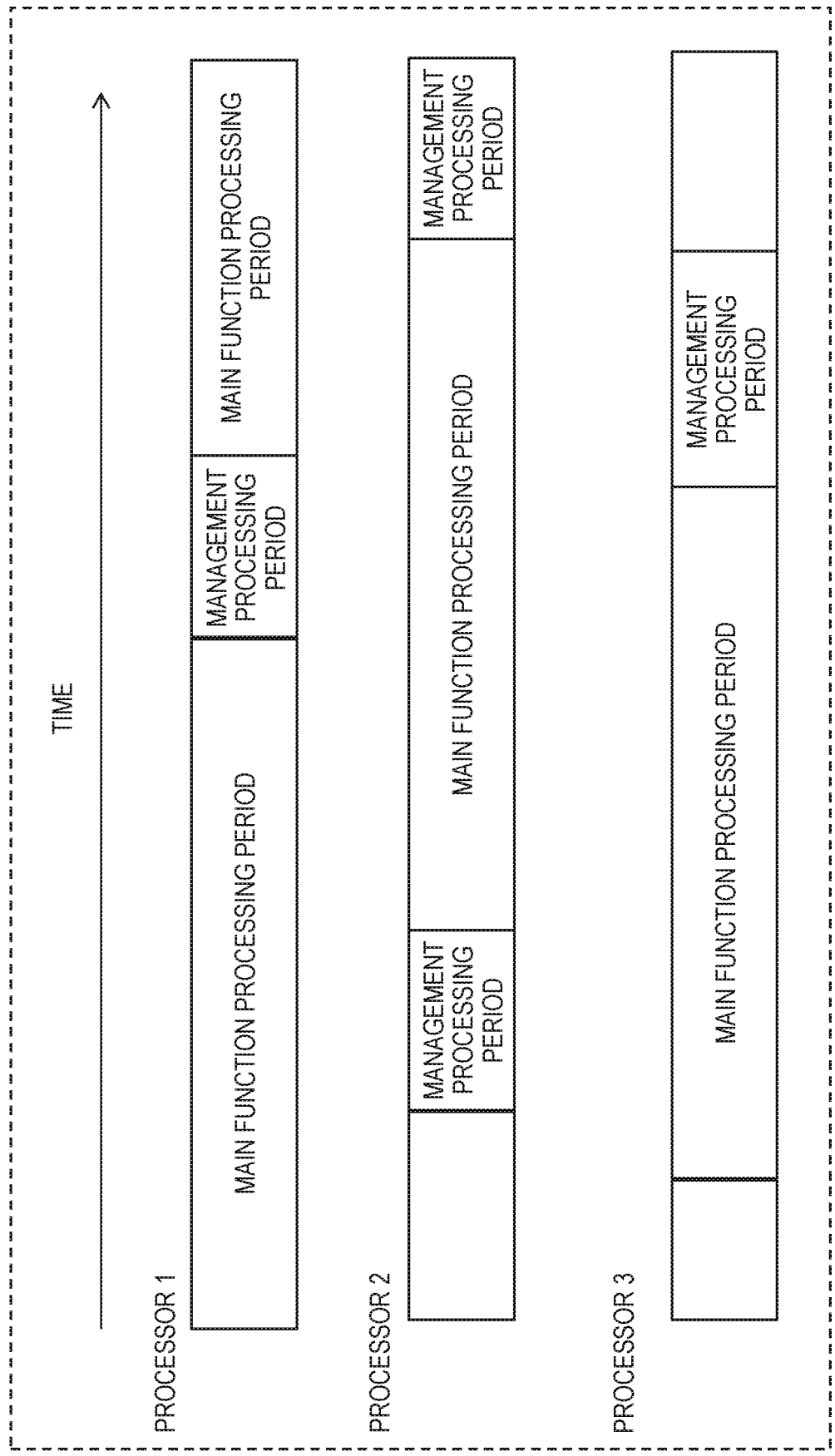
FIG. 6 is a diagram for illustrating a processing schedule in which processing executed by processors is scheduled.

FIG. 6 is a diagram for illustrating a processing schedule in which processing executed by the processors 131 is scheduled. A processing schedule of three processors, Processor 1, Processor 2, and Processor 3, is illustrated as an example. A main function processing period in which main function processing is executed and a management processing period in which management processing is executed are repeated alternatingly. The main function processing period is a period in which the processors 131 execute processing other than management processing. Examples of main function processing include I/O processing executed in response to an I/O request from the host computer, and a response to an inquiry request.

The management processing period is a period in which management processing is executed by the processors 131. Management processing is the processing of executing a management instruction from the management module 136 (management request from the management client 15). Examples of management processing include the creation of a logical volume, a reference to a logical volume, the changing of host information, and the changing of user information.

Each processor 131 executes management processing between one main function processing period and the next main function processing period. For example, one processor 131 starts current management processing after a given length of time elapses since the last management processing period. An upper limit value is set to the length of one management processing period. Each processor 131 sequentially obtains management instructions executable in a given management processing period from the management instruction buffer 323, and executes the obtained management instructions. The processor 131 executes a management instruction and returns a response to the management instruction to the management module 136.

In the example of FIG. 6, different processors 131 have asynchronous processing schedules. The cycle of management processing and the upper limit value of the length of one management processing period may be common to all processors 131, or may vary from one processor 131 to another or from one storage node 13 to another. Each processor 131 receives management instructions only at given intervals and executes the management instructions sequentially, thereby reducing the influence of management processing on main function processing.

Figure 7:
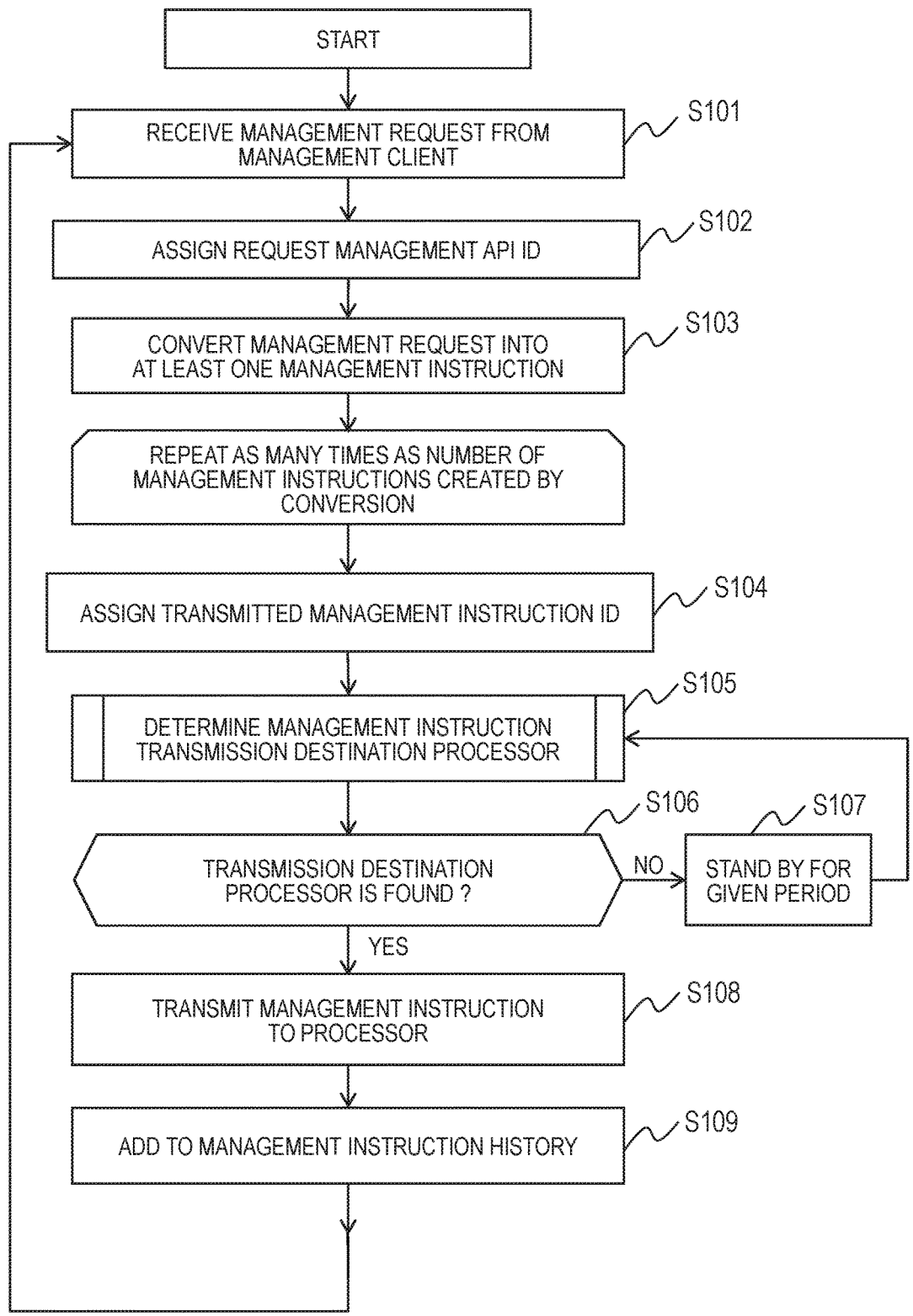
FIG. 7 is a flow chart for the issuing of a management instruction by a management module.

FIG. 7 is a flow chart for the issuing of a management instruction by the management module 136. The management program 369 (the processor 361) receives a management request from the management client 15 (Step S101). The management program 369 assigns a request management API ID to the received management request (Step S102). Each request management API ID is unique throughout the management module 136.

The management program 369 converts the management request into at least one management instruction (Step S103). For each management instruction generated, the management program 369 executes Step S104 to Step S109 described below.

The management program 369 assigns a transmitted management instruction ID to the generated management instruction (Step S104). The management instruction is identified uniquely throughout the management module 136 by the combination of a request management API ID and a transmitted management instruction ID. The management program 369 determines to which processor the management instruction is to be transmitted (Step S105). Details of how a transmission destination processor to which a management instruction is transmitted are described later with reference to FIG. 8.

The management program 369 next determines whether there is a processor to which the management instruction can be transmitted (Step S106). When it is found out as a result of Step S105 that there is no processor to which the management instruction can be transmitted (Step S106: NO), the management program 369 stands by for a predetermined length of time (Step S107), and returns to Step S105. When the retry count reaches a prescribed value, the management program 369 may send an error message to the management client 15 in response to the received management request.

When the result of Step S105 indicates a particular processor 131 (Step S106: YES), the management program 369 transmits the management instruction to the determined processor 131 (Step S108). The management instruction to be transmitted is stored in the management instruction buffer 323. With the management instruction buffer 323, a management instruction can be issued to the processor 131 that is in a main function processing period, and a management instruction is accordingly issued at any time.

The management program 369 adds information about the transmitted management instruction to the management instruction history table 368 (Step S109). Specifically, the management program 369 stores the request management API ID assigned in Step S102 and the transmitted management instruction ID assigned in Step S104 in the request management API ID column 681 and the transmitted management instruction ID column 682, respectively.

The management program 369 registers, in the processor ID column 684, a value used to identify the processor 131 determined in Step S105, and registers, in the storage node ID column 683, a value used to identify a storage node in which the processor 131 determined in Step S105 is located. The management program 369 stores a value indicating the type of the transmitted management instruction in the management instruction type column 685.

The management program 369 stores the processing time of the transmitted management instruction in the processing time column 686. The management program 369 refers to the processor table 366 to identify whether the storage node 13 in which the transmission destination processor 131 is located is the master node or a slave node. The management program 369 refers to the management instruction type table 367 to determine the processing time based on the type of the transmitted management instruction and the attribute (master/slave) of the storage node in which the transmission destination processor is located.

The management program 369 registers "not completed" in the management instruction completion status column 688. As described later, the management program 369 changes the value "not completed" to "completed" when a response to the management instruction is received from the processor 131.

Different management modules 136 may provide different management APIs to convert a management request from the management client into at least one management instruction by different algorithms.

Figure 8:
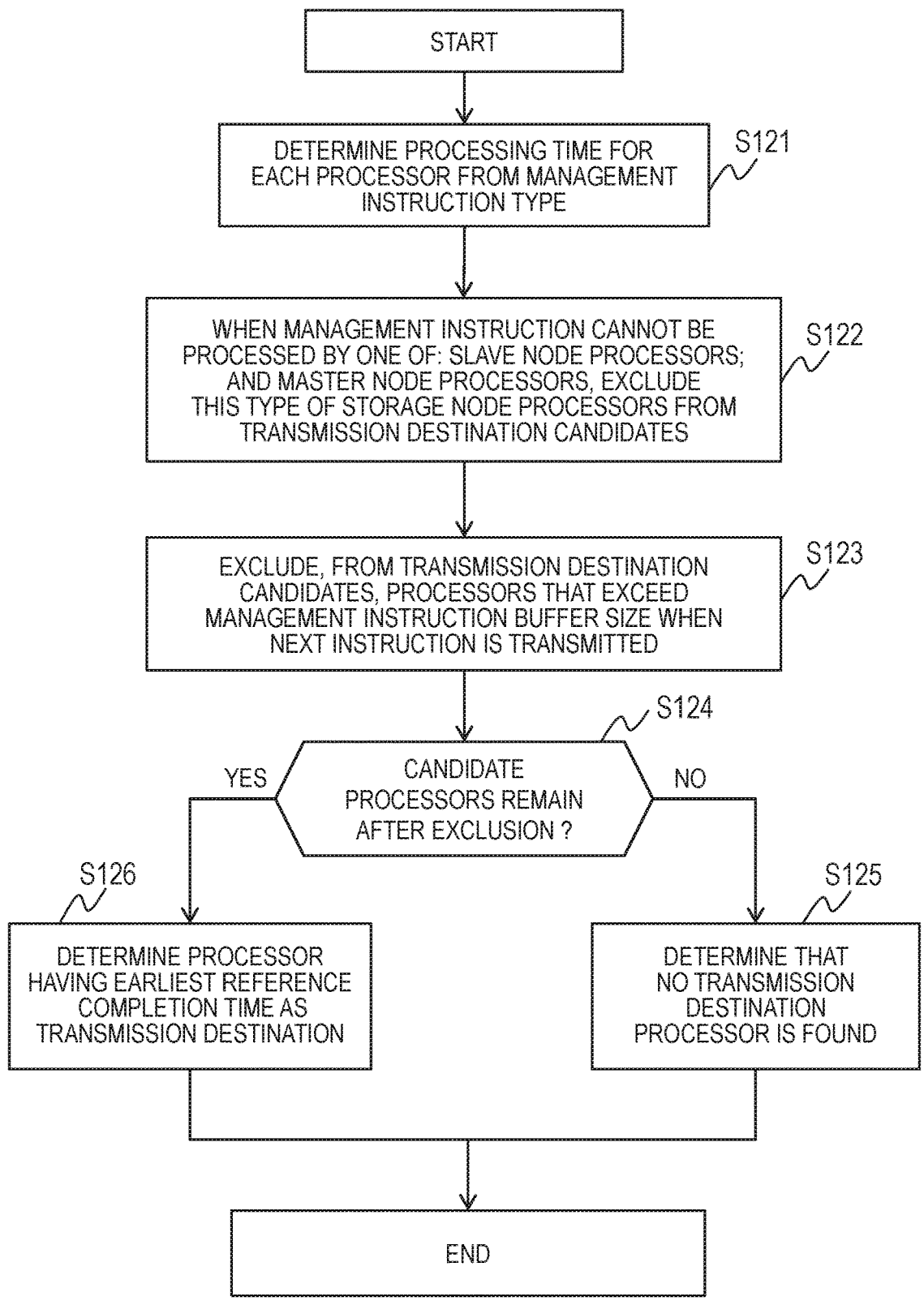
FIG. 8 is a flow chart for illustrating details of how a processor to which a management instruction is transmitted is determined.

FIG. 8 is a flow chart for illustrating details of how a processor to which a management instruction is transmitted is determined (Step S105). The management program 369 first determines, for each processor, the processing time from the management instruction type (Step S121). Specifically, the management program 369 refers to the management instruction type table 367 to determine the processing time of a master node processor and the processing time of a slave node processor that are associated with the management type of the management instruction to be transmitted. The processing time of a processor is determined by the attribute (master/slave) of a storage node in which the processor is located.

When the management instruction to be transmitted cannot be processed by processors of one of: the master storage node; and slave storage nodes, the management program 369 excludes processors of the one of the storage node types from transmission destination candidates (Step S122). The management program 369 can find out, for the master node and slave nodes each, whether the type of management instruction to be transmitted can be executed by the master node or a slave node by referring to the processing node column 672 of the management instruction type table 367.

The management program 369 subsequently excludes, from transmission destination candidates, processors that exceed the management instruction buffer size when the next management instruction is transmitted (Step S123). The management program 369 refers to the management instruction history table 368 to count, for each candidate processor, the total number of uncompleted management instructions.

The management program 369 obtains, for each candidate processor, the management instruction buffer size from the management instruction buffer size column 663 of the processor table 366. The management program 369 excludes, from transmission destination candidates, a processor for which the total number of uncompleted management instructions has reached the obtained management instruction buffer size. This reduces the chance of overflow of the management instruction buffer.

When the management instruction buffer for all processors 131 in one storage node 13 is located in the memory 132 as in this example, instead of providing a management instruction buffer for each processor 131 and placing the management instruction buffer in one of the NICs 135, the management instruction buffer size may be managed on a storage node-by-storage node basis. Specifically, the management program 369 may compare the total number of uncompleted management instructions directed to all processors 131 in one storage node 13 against a prescribed management instruction buffer size.

The management program 369 next determines whether any transmission destination candidate processor remains after the exclusion (Step S124). When all processors are excluded, leaving no transmission destination candidate processors (Step S124: NO), the management program 369 determines that there is no transmission destination processor (Step S125). When there are transmission destination candidate processors left (Step S124: YES), the management program 369 determines one of the remaining candidate processors that has the earliest reference completion time as the transmission destination processor of the management instruction to be transmitted (Step S126).

The reference completion time is determined based on the oldest management instruction transmission time and the processing times of uncompleted management instructions. Specifically, the management program 369 selects from the management instruction history table 368 records of candidate processors in which the value of the management instruction completion status column 688 is "not completed". The management program 369 selects the oldest time out of values registered in the transmission time column 687 in the selected records.

The management program 369 further calculates the sum of the values of the processing time column 686 in the selected records. A value obtained by adding the sum of processing times of uncompleted management instructions to the oldest transmission time is the reference completion time. The management program 369 checks each calculated reference completion time to determine a processor that has the earliest reference completion time as the transmission destination processor to which the management instruction is to be transmitted.

The reference completion time indicates a relative time for comparing an estimated time of each processor at which the processor is estimated to complete all remaining management instructions. By selecting a transmission destination processor based on the reference completion time, which processor is capable of executing a management instruction at an earlier time can be estimated with precision.

The management program 369 may use an algorithm different from the algorithm described above to determine the transmission destination processor. For instance, the management program 369 may select as a transmission destination processor a candidate processor that has the shortest total processing time of uncompleted management instructions (the shortest remaining processing time). The precision of estimation in this case is lower than when the reference completion time is used, but the transmission destination can be determined efficiently. Another advantage of this configuration is that the transmission time of a management instruction is not required to be managed.

By selecting a processor to which a management instruction is to be transmitted based on the sum of processing times of uncompleted management instructions in the manner described above, the management instruction is processed with an improved efficiency and the time required to complete the management instruction can be shortened.

To give another example, the management program 369 may select a candidate processor that has the smallest number of remaining management instructions as the transmission destination processor. The precision of estimation in this case is lower than when the remaining processing time is used, but the transmission destination can be determined efficiently. Another advantage of this configuration is that the transmission time and processing time of a management instruction are not required to be managed. The management program 369 may take a simpler approach in which one processor is selected at random as a transmission destination processor out of candidate processors.

The remaining processing time can be estimated more accurately by managing the processing time of the master node and the processing times of slave nodes separately and calculating the processing time of remaining management instructions based on the separately managed processing times as in the example described above. The processing time of all management instructions managed in the management instruction type table 367 may be common to the master node and slave nodes.

The processor 131 to which the next management instruction is to be transmitted is selected based on uncompleted management instructions already transmitted to the respective processors 131 as described above, thereby assigning management instructions to the processors 131 in a manner suited to the load states of the processors 131, and accomplishing more efficient execution of management instructions by a plurality of processors 131.

Figure 9:
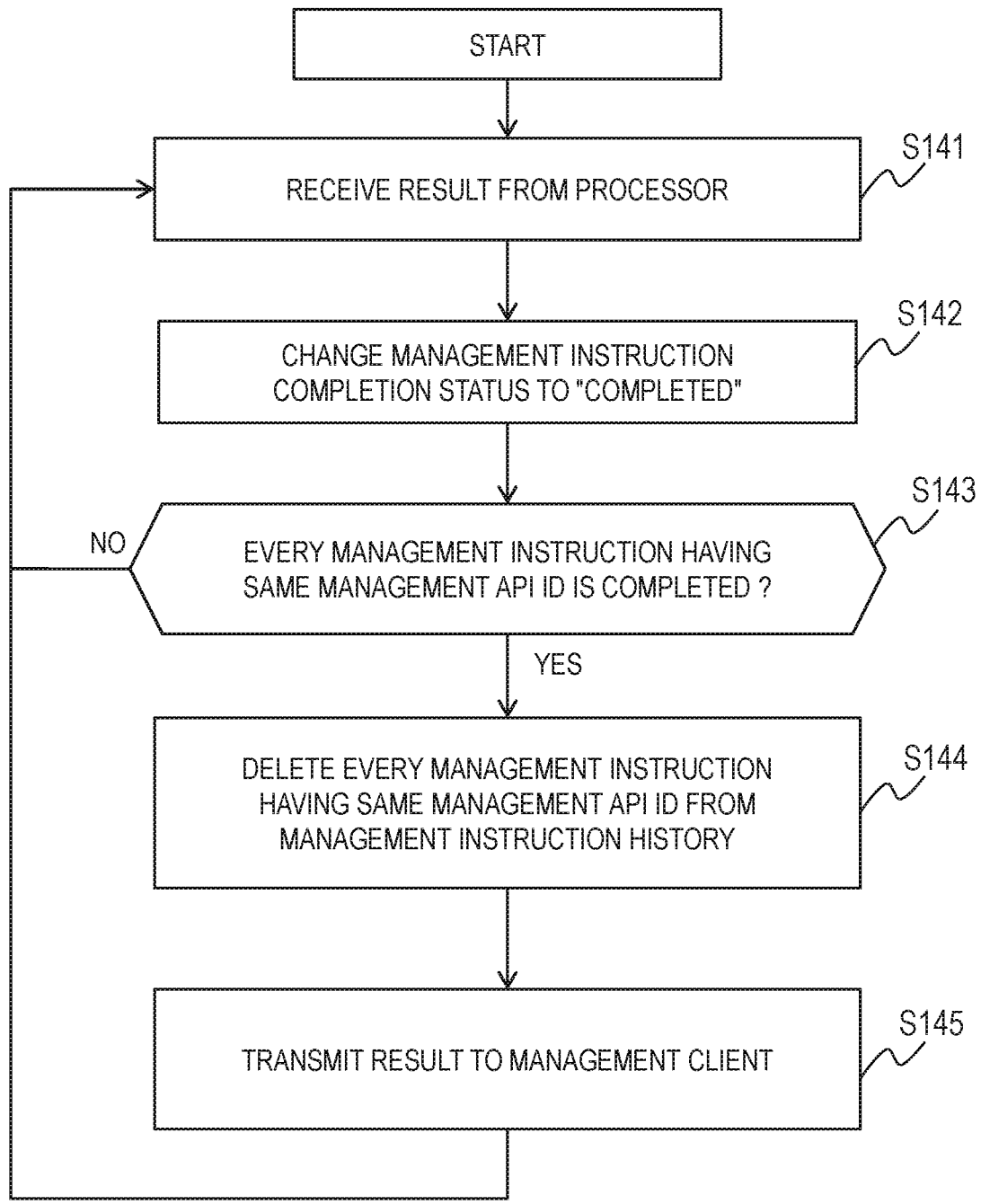
FIG. 9 is a flow chart for processing executed by a management module that has received a response to a management instruction from a processor.

FIG. 9 is a flow chart for processing executed by the management module 136 that has received a response to a management instruction from one of the processors 131. The management program 369 (the processor 361) first receives the result of executing a management instruction (a response to a management instruction) from one of the processors 131 (Step S141). Specifically, the management program 369 receives a packet containing the result of executing a management instruction from one of the processors 131.

The management program 369 changes the value of the management instruction completion status column 688 in the management instruction history table 368 from "not completed" to "completed" in a record for the management instruction corresponding to the received result (Step S142). The management program 369 refers to the header of the received packet to identify the sender processor. The management program 369 selects from the management instruction history table 368 a record of the sender processor for the oldest uncompleted management instruction, and changes the value of the management instruction completion status column 688 in the selected record from "not completed" to "completed". The management program 369 temporarily stores the received result in the memory 362, if necessary.

The management program 369 next determines whether every management instruction that has the same management API ID as the management API ID of the management instruction corresponding to the received result is completed (Step S143). Specifically, the management program 369 selects from the management instruction history table 368 every record in which the value of the request management API ID column 681 is the same as the management API ID of the management instruction corresponding to the received result. The management program 369 checks the value of the management instruction completion status column 688 in each selected record.

When one of the management instructions that have the same management API ID as the management API ID of the management instruction corresponding to the received result is uncompleted (Step S143: NO), the management program 369 returns to Step S141 to wait for the next management instruction execution result from one of the processors 131.

When every management instruction that has the same management API ID as the management API ID of the management instruction corresponding to the received result is completed (Step S143: YES), the management program 369 deletes from the management instruction history table 368 a record for every management instruction that has this management API ID (Step S144). The management program 369 sends a result on which the result of every management instruction that has this management API ID is reflected to the management client 15 in response to the management request (Step S145). In this manner, a proper processing result can be sent in response to a management request from the management client 15. The record for the completed management instruction may be retained instead of being deleted.

Figure 10:
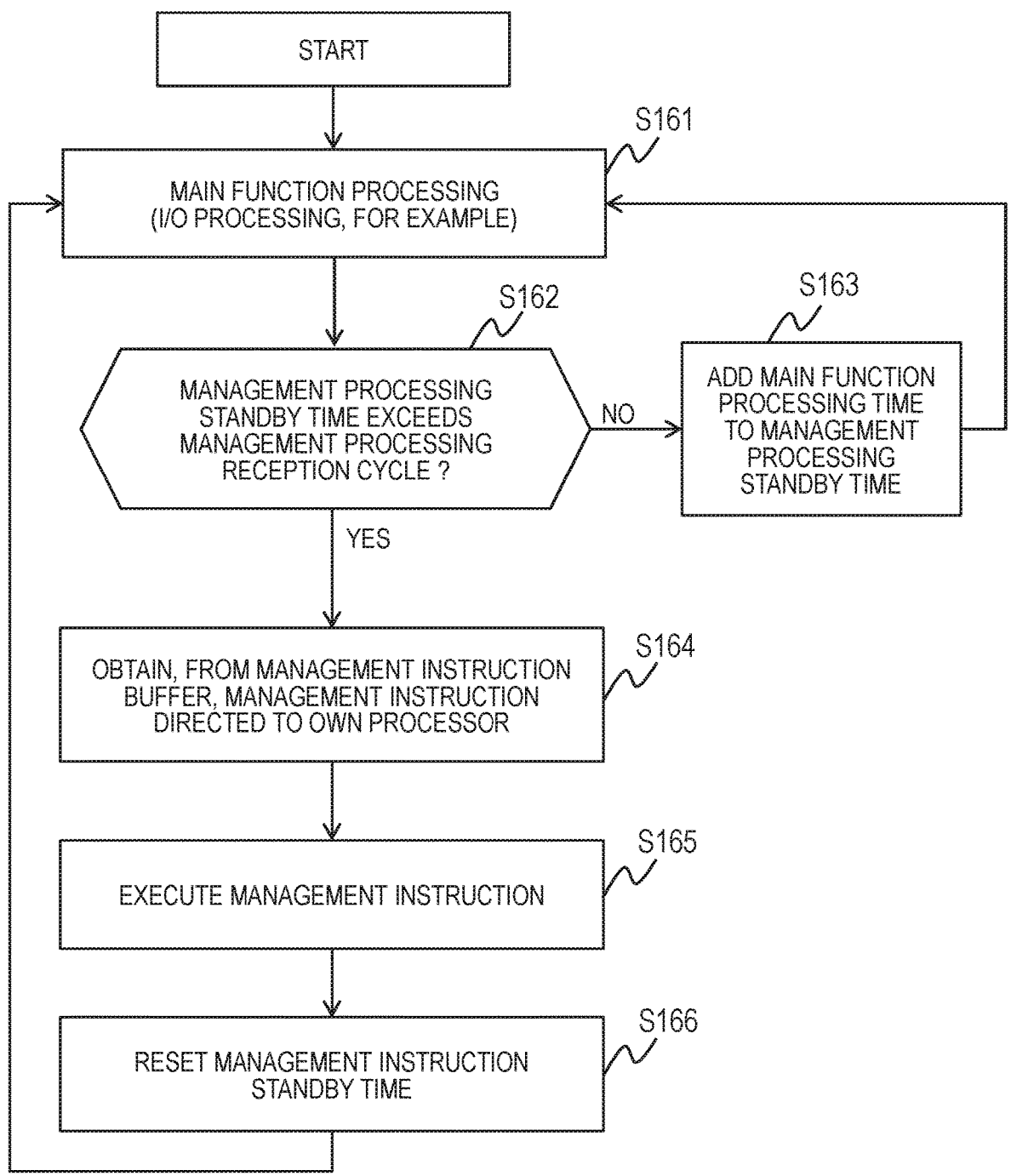
FIG. 10 is a flow chart for processing executed by a storage node processor (a control program).

FIG. 10 is a flow chart for processing executed by each processor 131 (the control program 321) of the storage node 13. As described with reference to FIG. 6, the control program 321 executes management processing periodically. The control program 321 executes main function processing (Step S161), and then determines whether a management processing standby time has exceeded a given management processing reception cycle (Step S162). The management processing standby time is the time elapsed since the last management processing period.

When it is determined that the management processing standby time has not exceeded the given management processing reception cycle (Step S162: NO), the control program 321 adds the length of time of the main function processing executed in Step S161 to the current management processing standby time (Step S163), and returns to Step S161 to execute the next main function processing. The control program 321 may use a timer to measure the management processing standby time.

When the management processing standby time exceeds the given management processing reception cycle (Step S162: YES), the control program 321 starts management processing. The control program 321 obtains from the management instruction buffer 323 a management instruction directed to the processor (own processor) 131 that is executing the control program 321 (Step S164), and executes the obtained management instruction (Step S165).

When the management instruction buffer 323 stores a plurality of management instructions directed to its own processor 131, the control program 321 executes the management instructions sequentially. After executing every management instruction that is stored in the management instruction buffer 323 and that is directed to its own processor 131, or when a given length of time elapses since the start of the current management processing period, the control program 321 resets the management processing standby time (Step S166). The control program 321 then returns to Step S161 to execute the next main function processing.

Second Embodiment

The number of management instructions that can be issued to one processor 131 by the management module 136 is limited to an upper limit value registered in the management instruction buffer size column 663 in the processor table 366 as described above. The value of the management instruction buffer size column 663 may be changeable in an example. This way, management processing more suited to a user request or to the system configuration is accomplished.

The management program 369 cooperates with the management program 369 of another storage node 13 to update the value of the management instruction buffer size column 663 in the processor table 366 held by each management module 136.

Figure 11:
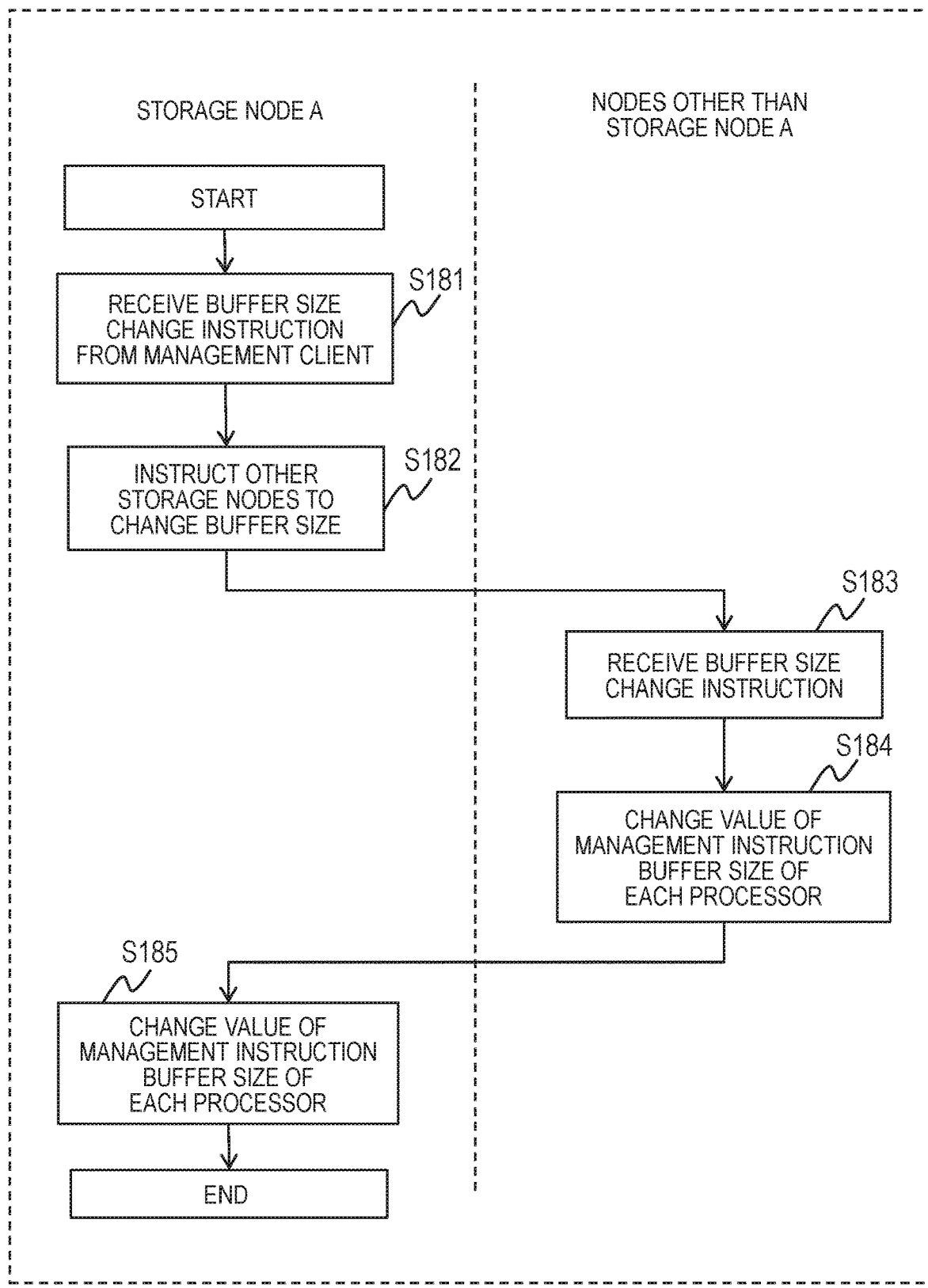
FIG. 11 is a sequence diagram for illustrating the sequence of updating a value in a management instruction buffer size column of the processor table in a second embodiment of this disclosure.

FIG. 11 is a sequence diagram for illustrating the sequence of updating the value of the management instruction buffer size column 663 in the processor table 366. The management program 369 of a particular storage node, which is a storage node A, receives an instruction to change the management instruction buffer size from the management client 15 (Step S181). The management program 369 of the storage node A transmits the management instruction buffer size change instruction to each of the other storage nodes over the network 137 (Step S182). For example, each management module 136 holds a table in which the addresses of the management modules 136 in the system are managed, and refers to the table to determine a transmission destination to which the instruction is to be transmitted.

The management program 369 in each of the other storage nodes receives the management instruction buffer size change instruction (Step S183), and changes, for each processor, the value of the management instruction buffer size column in the processor table 366 (Step S184).

The management program 369 of the storage node A changes, for each processor, the value of the management instruction buffer size column 663 in the processor table 366 of the storage node A (Step S185).

The management program 369 of the storage node A may transmit the buffer size change instruction to other storage nodes after changing the value of the management instruction buffer size column 663 in its own storage node. The value of the management instruction buffer size column 663 may be common to all storage nodes 13, or may be set for each storage node separately. For example, when only one storage node 13 receives a high priority management request from the management client 15, the management instruction buffer size allocated to this storage node 13 may be set larger than the management instruction buffer size of any other storage node 13.

In each storage node 13, the value of the management instruction buffer size column 663 may be common to all processors of the storage node 13, or may vary from one processor to another. The management program 369 can keep a particular processor 131 from executing management processing by setting the management instruction buffer size that is allocated to this processor 131 to 0. No management instruction is issued to this processor 131, and the processor 131 executes only main function processing.

The management program 369 may use a trigger that is not an instruction from the management client 15 to change the value of the management instruction buffer size column 663. For example, the management program 369 may automatically change the value of the management instruction buffer size column 663 with a removal of an existing storage node, or an addition of a new storage node, as a trigger.

Third Embodiment

Figure 12:
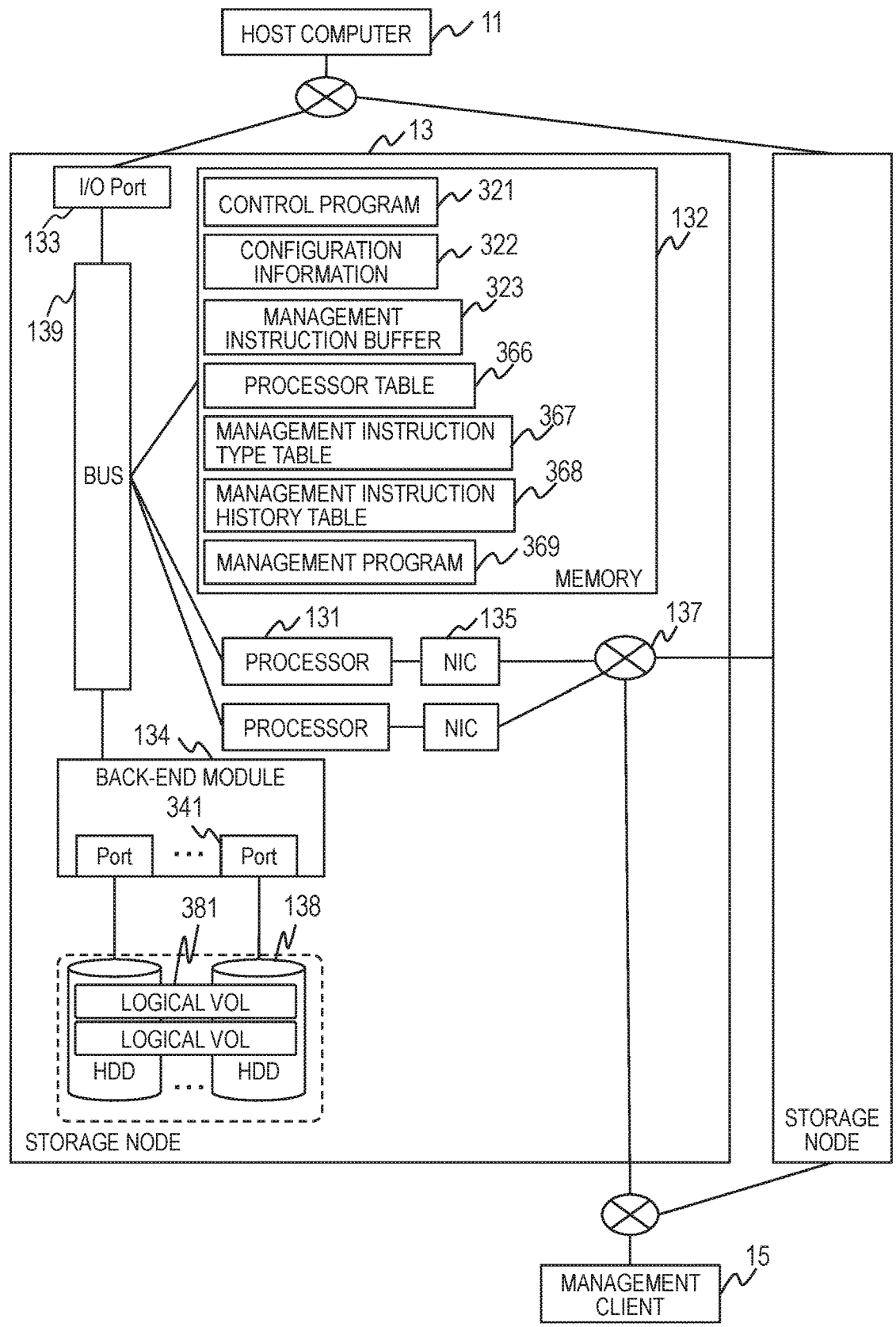
FIG. 12 is a diagram for illustrating a configuration example of a storage node in a third embodiment of this disclosure.

FIG. 12 is a diagram for illustrating another configuration example of each storage node 13. In the configuration example of FIG. 12, the function of the management module is implemented by the processor 131 that operates as programmed by the management program 369. This reduces the total number of hardware components by eliminating hardware components for the management module.

The memory 132 stores, in addition to the information illustrated in the configuration of FIG. 1, the processor table 366, the management instruction type table 367, the management instruction history table 368, and the management program 369. The configurations of the management instruction type table 367, the processor table 366, and the management instruction history table 368 are as described above with reference to FIG. 3, FIG. 4, and FIG. 5, respectively. The management program 369, too, operates as described above.

Fourth Embodiment

In a fourth embodiment of this disclosure, the management modules 136 of the plurality of storage nodes 13 cooperate with one another to select a processor to which a management instruction is to be transmitted, in order to avoid an overflow of the management instruction buffer 323.

Figure 13:
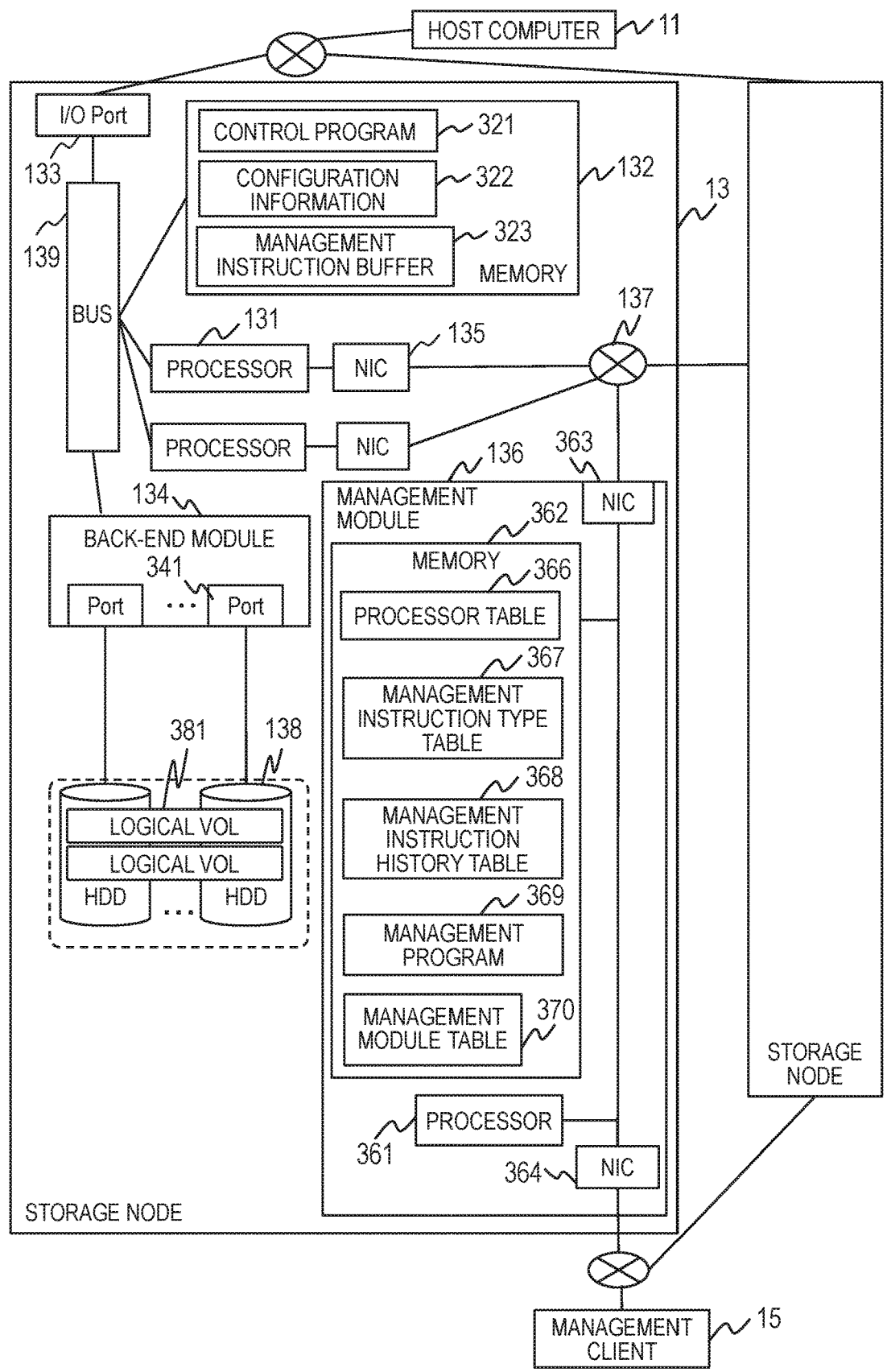
FIG. 13 is a diagram for illustrating a configuration example of a storage node in a fourth embodiment of this disclosure.

FIG. 13 is a diagram for illustrating still another configuration example of each storage node 13. The management module 136 includes a management module table 370 in addition to the configuration illustrated in FIG. 1. FIG. 14 is a diagram for illustrating a configuration example of the management module table 370. The management module table 370 holds information about the management modules 136 in the system.

The management module table 370 includes a management module ID column 701, a master/slave column 702, and an IP address column 703. The management module ID column 701 indicates, for each management module 136 in the system, the ID of the management module 136. The master/slave column 702 indicates, for each management module 136, whether the management module 136 is the master or a slave.

The master/slave attribute of the management modules 136 differs from the master/slave attribute of the storage nodes 13 (the processors 131). A user (e.g., system designer) selects one management module 136 out of a plurality of management modules 136 to set, in advance, the selected management module 136 as the master module. The rest of the management modules 136 are slave management modules. The IP address column 703 indicates, for each management module 136, the IP address of the management module 136.

FIG. 15 is a diagram for illustrating a configuration example of the management instruction history table 368. The management instruction history table 368 includes an instruction source management module ID column 689 in addition to the configuration described with reference to FIG. 5. The instruction source management module ID column 689 is used only by the master management module 136, and is not used by the slave management modules 136. The instruction source management module ID column 689 indicates the management module 136 that has requested the master management module 136 to select a transmission destination processor.

Figure 16:
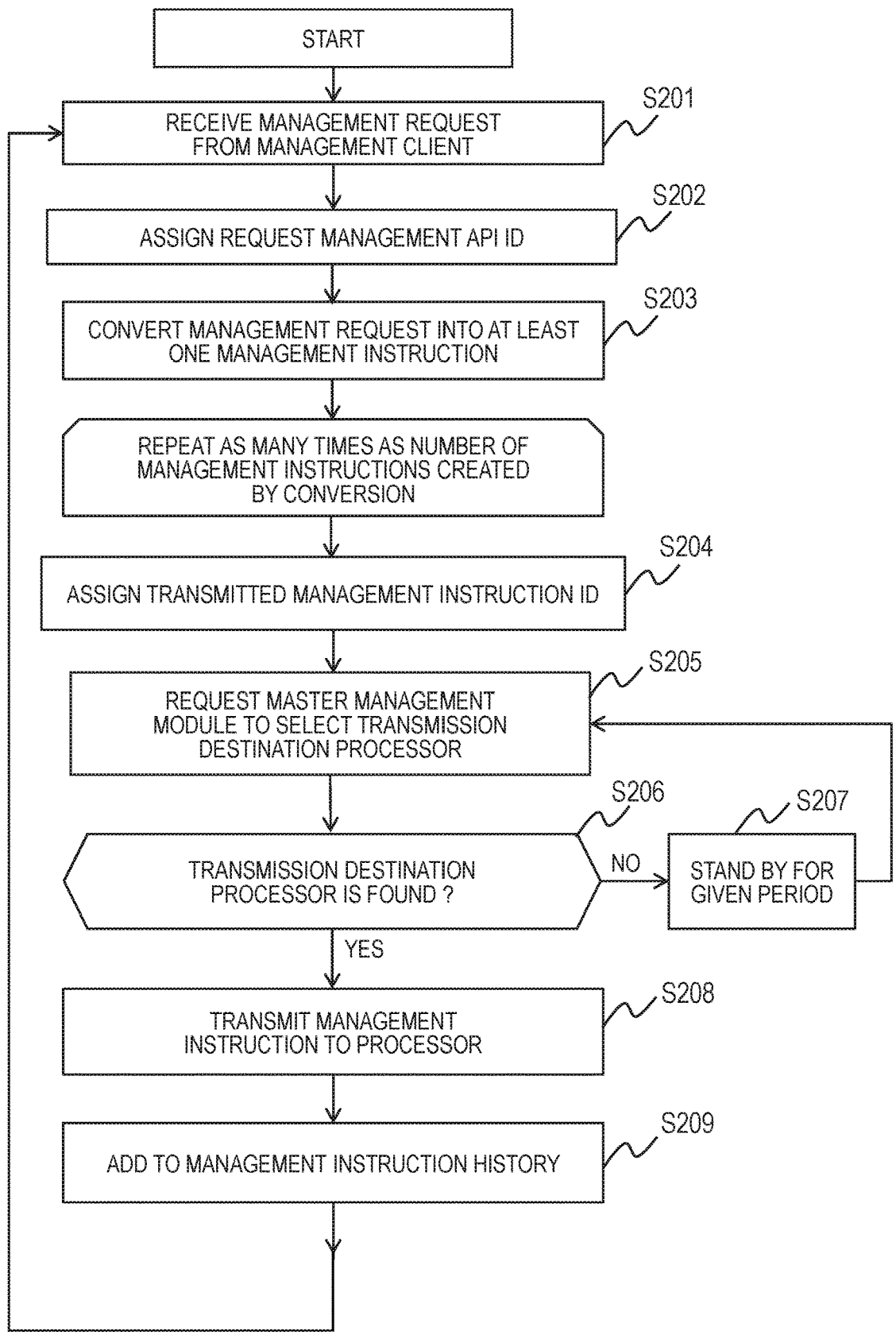
FIG. 16 is a flow chart for the issuing of a management instruction by a slave management module.

FIG. 16 is a flow chart for the issuing of a management instruction by one of the slave management modules 136. In this example, the slave management module 136 requests the master management module 136 to select the processor 131 to which a management instruction is to be transmitted. Step S201 to Step S204 in the flow chart of FIG. 16 are the same as Step S101 to Step S104 in the flow chart of FIG. 7.

In Step S205, (the management program 369 of) the slave management module 136 requests the master management module 136 to select a transmission destination processor. The slave management module 136 refers to the management module table 370 to identify the master management module 136. The slave management module 136 transmits a processor selection request, which includes a management instruction type, a request management API ID, and a transmitted management instruction ID, to the master management module 136.

The master management module 136 determines the processor to which the management instruction is to be transmitted, in the manner described with reference to FIG. 8, and sends a response indicating the determined processor 131 to the requester slave management module 136, which has made the request. When there is no processor 131 that can be selected, the master management module 136 sends a response to that effect to the requester slave management module 136.

When the response received from the master management module 136 indicates that there is no transmission destination processor 131 (Step S206: NO), the slave management module 136 stands by for a given length of time (Step S207), and then resends the processor selection request to the master management module 136.

When the response received from the master management module 136 specifies the transmission destination processor 131 (Step S206: YES), the slave management module 136 transmits the management instruction to the specified processor 131 (Step S208). The slave management module 136 also adds a record for the transmitted management instruction to the management instruction history table 368 (Step S209).

Figure 17:
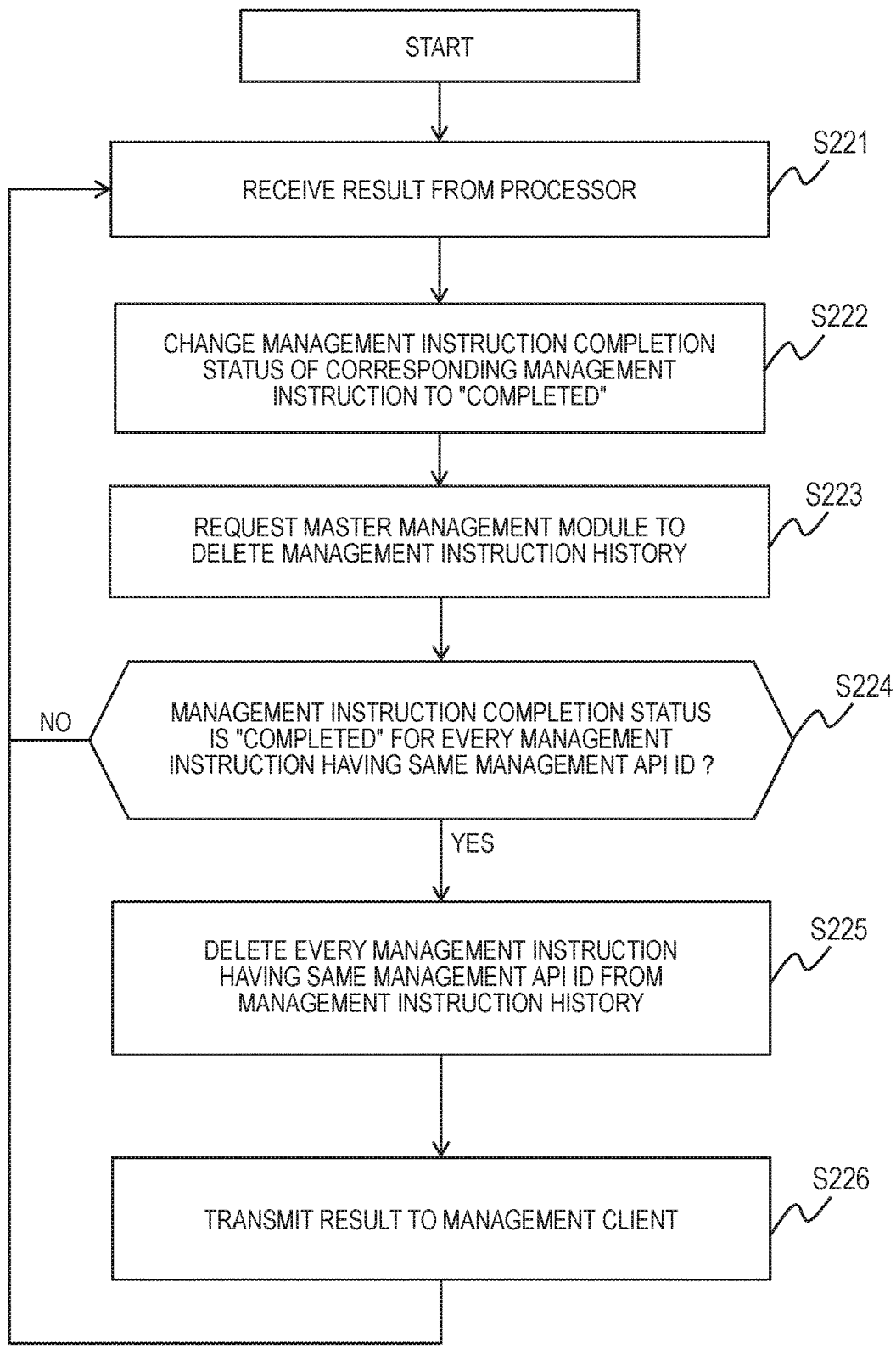
FIG. 17 is a flow chart for processing executed by a slave management module that has received a response to a management instruction from a processor.

FIG. 17 is a flow chart for processing executed by the slave management module 136 that has received a response to a management instruction from one of the processors 131. Step S221, Step S222, and Step S224 to Step S226 are the same as Step S141 to Step S145 in the flow chart of FIG. 9.

In Step S223, the slave management module 136 requests the master management module 136 to delete a record for the management instruction from the management instruction history table 368. The request indicates a request management API ID and a transmitted management instruction ID.

Figure 18:
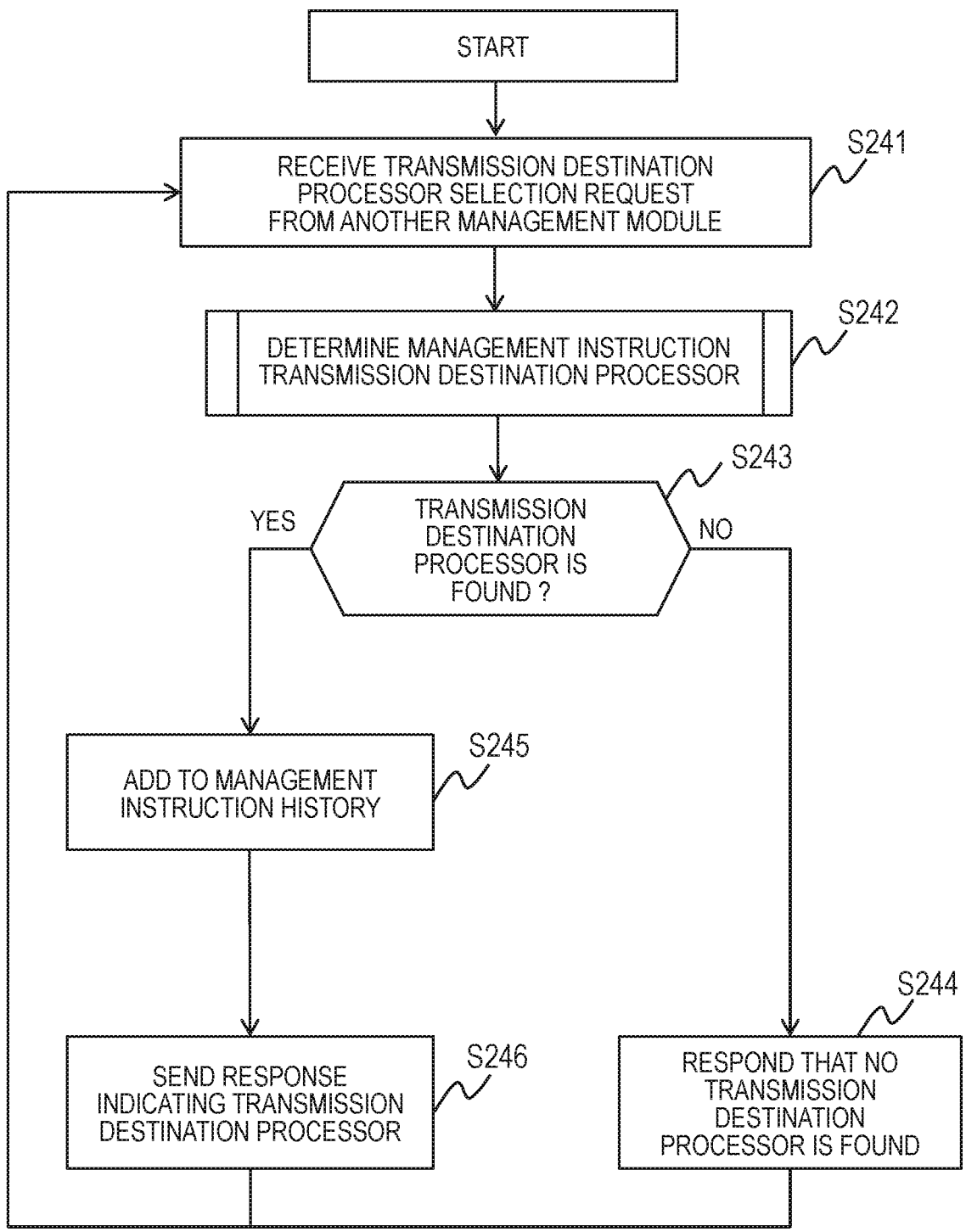
FIG. 18 is a flow chart for illustrating how a master management module determines a processor to which a management instruction is to be transmitted in response to a transmission destination processor setting request received from another management module.

FIG. 18 is a flow chart for illustrating how the master management module 136 determines a processor to which a management instruction is to be transmitted in response to a transmission destination processor setting request received from another management module 136. The processing of converting a management request received from the management client 15 into at least one management instruction is as described with reference to the flow chart of FIG. 8.

The master management module 136 (the processor 361 or the management program 369) receives a transmission destination processor selection request from another management module 136 (Step S241). The master management module 136 determines the processor 131 to which the management instruction is to be transmitted in response to the request (Step S242). The method of determining the transmission destination processor is as described with reference to the flow chart of FIG. 8.

When there is no processor to which the management instruction can be transmitted (Step S243: NO), the master management module 136 sends a response that indicates a request management API ID, a transmitted management instruction ID, and the fact that there is no transmission destination processor to the requester slave management module 136, which has made the request (Step S244).

When there is a processor to which the management instruction can be transmitted (Step S243: YES), the master management module 136 adds a record for this management instruction to the management instruction history table 368 (Step S245). The master management module 136 records the ID of the sender slave management module, which has transmitted the processor selection request, in the instruction source management module ID column 689. The master management module 136 records, for example, a time at which the record is added in the transmission time column 687.

The master management module 136 then sends a response that indicates a request management API ID, a transmitted management instruction ID, and a transmission destination processor to the requester slave management module 136, which has made the request (Step S246).

As described above, the master management module 136 determines a transmission destination processor to which a management instruction is to be transmitted, in place of the plurality of slave management modules 136. The master management module 136 determines, for each of the plurality of management modules 136, in a centralized manner, a transmission destination processor to which a management instruction is to be transmitted, thereby effectively preventing an overflow of the management instruction buffer 323.

Figure 19:
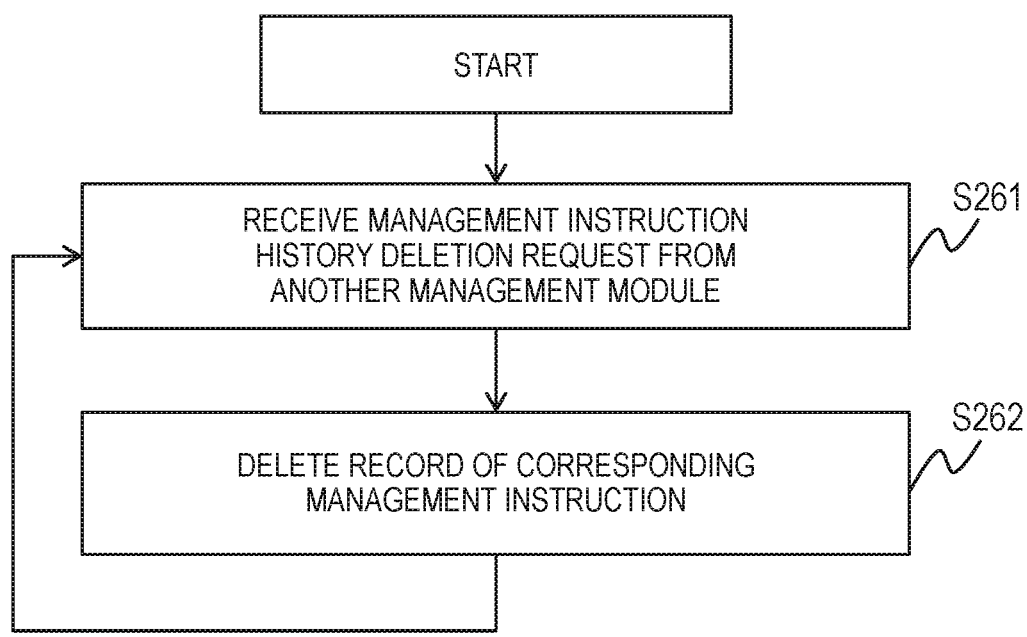
FIG. 19 is a flow chart for processing executed by a master management module in response to a management instruction history deletion request from another management module.

FIG. 19 is a flow chart for processing executed by the master management module 136 in response to a management instruction history deletion request from another management module 136. The master management module 136 (the processor 361 or the management program 369) receives a management instruction history deletion request from another management module 136 (Step S261). The management instruction history deletion request specifies a request management API ID and a transmitted management instruction ID.

The master management module 136 deletes from the management instruction history table 368 a record in which the values of the instruction source management module ID column 689, the request management API ID column 681, and the transmitted management instruction ID column 682 match the values indicated by the management instruction history deletion request. Each slave management module 136 transmits information about an already executed management instruction to the master management module 136, which enables the master management module 136 to update the management instruction history table 368 at an appropriate time.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings shows control lines and information lines as considered necessary for explanations but do not show all control lines or information lines in the products. It can be considered that almost of all components are actually interconnected.

What is claimed is:

1. A storage system, comprising:
a management processor;
a plurality of main processors;
a buffer coupled to the plurality of main processors; and
a plurality of storage nodes that communicate via a communication path,
wherein each of the plurality of main processors is configured to alternately switch between a period in which main function processing, including I/O (input/output) processing in response to an I/O request from a host, is executed and a period in which a management instruction is executed,
wherein the management processor is configured to:
manage information that associates each of a plurality of uncompleted management instructions, which have previously been transmitted to the plurality of main processors, with respective transmission destination main processors;
manage a buffer size of the buffer allocated to each of the plurality of main processors for management instructions; and
select, based on the uncompleted management instructions of the plurality of main processors, a transmission destination main processor to which a next management instruction is to be transmitted, from among candidate transmission destination main processors of the plurality of main processors; and
transmit the next management instruction to the selected transmission destination main processor,
wherein the buffer temporarily stores the transmitted management instructions, including the next management instruction, to be executed by the plurality of main processors,
wherein each of the plurality of main processors is configured to obtain the respective management instructions, from the buffer, to sequentially execute the obtained management instructions,
wherein the management processor excludes, from the candidate transmission destination main processors, each main processor for which a sum of the uncompleted management instructions and the next management instruction exceeds the allocated buffer size for the respective main processor,
wherein each of the plurality of storage nodes comprises a plurality of main processors and a memory, and
wherein the memory in each of the plurality of storage nodes stores shared information, which is synchronized among the plurality of storage nodes.

2. The storage system according to claim 1, wherein the management processor is configured to:
refer to management instruction type information, which indicates, for each management instruction type, an expected processing time, to determine, for each of the plurality of main processors, an expected processing time of an uncompleted management instruction of the each of the plurality of main processors;
calculate, for each of the plurality of main processors, a sum of expected processing times of transmitted uncompleted management instructions; and
select the transmission destination main processor based on the sum calculated for each of the plurality of main processors.

3. The storage system according to claim 2,
wherein the plurality of storage nodes comprise one storage node having a master attribute and at least one storage node having a slave attribute,
wherein the shared information that is stored in the memory of the one storage node having the master attribute is updated, and then the at least one storage nodes having the slave attribute updates the shared information that is stored in the respective memories of each of the at least one storage nodes having the slave attribute,
wherein the management instruction type information indicates, for at least one management instruction type, an expected processing time expected of the master attribute and an expected processing time expected of the slave attribute, and
wherein the management processor is configured to select the expected processing time expected of the master attribute for the plurality of main processors of the one storage node having the master attribute, and to select the expected processing time expected of the slave attribute for the plurality of main processors of each of the at least one storage node having the slave attribute.

4. The storage system according to claim 1, wherein a number of uncompleted management instructions is determined for each of the plurality of main processors, and the management processor is configured to select the transmission destination processor based on the number of uncompleted management instructions.

5. The storage system according to claim 1,
wherein the plurality of storage nodes comprise one storage node having a master attribute and at least one storage node having a slave attribute,
wherein the shared information that is stored in the memory of the one storage node having the master attribute is updated, and then the at least one storage node having the slave attribute updates the shared information that is stored in the memory of each of the at least one slave-attribute storage node, and
wherein the management processor is configured to refer to information indicating a relation between a management instruction type and a storage node attribute capable of executing a management instruction of the management instruction type, in order to select the transmission destination main processor from among the plurality of main processors of storage nodes that have an attribute capable of executing the next management instruction.

6. The storage system according to claim 1, further comprising a plurality of management processors in which the management processor is included,
wherein the plurality of management processors comprise a master management processor and at least one slave management processor,
wherein the master management processor is configured to select, from the plurality of main processors, a second transmission destination main processor to which a management instruction issued by the at least one slave management processor is to be transmitted, in response to a request from the at least one slave management processor, and is configured to notify the second transmission destination main processor to the at least one slave management processor.

7. A storage system comprising:
a management processor;
a plurality of main processors;
a buffer coupled to the plurality of main processors; and
a plurality of storage nodes that communicate via a communication path, and
a plurality of management processors in which the management processor is included,
wherein each of the plurality of main processors is configured to alternately switch between a period in which main function processing, including I/O (input/output) processing in response to an I/O request from a host, is executed and a period in which a management instruction is executed,
wherein the management processor is configured to:
manage information that associates each of a plurality of uncompleted management instructions, which have previously been transmitted to the plurality of main processors, with respective transmission destination main processors;
manage a buffer size of the buffer allocated to each of the plurality of main processors for management instructions; and
select, based on the uncompleted management instructions of the plurality of main processors, a transmission destination main processor to which a next management instruction is to be transmitted, from among candidate transmission destination main processors of the plurality of main processors; and
transmit the next management instruction to the selected transmission destination main processor,
wherein the buffer temporarily stores the transmitted management instructions, including the next management instruction, to be executed by the plurality of main processors,
wherein each of the plurality of main processors is configured to obtain the respective management instructions, from the buffer, to sequentially execute the obtained management instructions,
wherein the management processor excludes, from the candidate transmission destination main processors, each main processor for which a sum of the uncompleted management instructions and the next management instruction exceeds the allocated buffer size for the respective main processor,
wherein each of the plurality of management processors is configured to separately manage a buffer size allocated for management instructions to each of the plurality of main processors, and wherein a first management processor, which is one of the plurality of management processors, is configured to change the buffer size that is allocated for management instructions to each of the plurality of main processors managed by the first management processor.

8. A method of issuing management instructions to a plurality of processors, each of which is configured to alternately switch between a period in which main function processing, including I/O (input/output) processing in response to an I/O request from a host, is executed and a period in which a management instruction is executed,
the method comprising:
referring to information that associates each of a plurality of uncompleted management instructions, which have previously been transmitted to the plurality of processors, with a respective transmission destination main processor;
manage a buffer size of the buffer allocated to each of the plurality of main processors for management instructions; and
selecting, based on the uncompleted management instructions of the plurality of processors, a transmission destination processor to which a next management instruction is to be transmitted, from among candidate transmission destination main processors of the plurality of processors; and
transmitting the next management instruction to the selected transmission destination processor,
wherein the buffer temporarily stores the transmitted management instructions, including the next management instruction, to be executed by the plurality of main processors,
wherein each of the plurality of main processors is configured to obtain the respective management instructions, from the buffer, to sequentially execute the obtained management instructions,
wherein the management processor excludes, from the candidate transmission destination main processors, each main processor for which a sum of the uncompleted management instructions and the next management instruction exceeds the allocated buffer size for the respective main processor,
wherein a plurality of storage nodes communicate via a communication path,
wherein each of the plurality of storage nodes includes a plurality of main processors and a memory, and
wherein the memory in each of the plurality of storage nodes stores shared information, which is synchronized among the plurality of storage nodes.

* * * * *